United States Patent
Ohkado

(12) 
(10) Patent No.: US 6,262,856 B1
(45) Date of Patent: Jul. 17, 2001

(54) MAGNETIC INFORMATION REPRODUCING APPARATUS HAVING POWER SUPPLY FIELD CANCELLATION FACILITY

(75) Inventor: Teruyuki Ohkado, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,712

(22) Filed: Jan. 25, 1999

(30) Foreign Application Priority Data

Jan. 30, 1998 (JP) .................................................. 10-034220

(51) Int. Cl.[7] ....................................................... G11B 5/00
(52) U.S. Cl. .................................... 360/1; 360/3; 360/55; 360/124; 360/137
(58) Field of Search ............................ 455/298; 396/312, 396/319; 360/3, 55, 124, 7, 137, 1

(56) References Cited

U.S. PATENT DOCUMENTS 5,113,208  5/1992  Stoneham et al. .

FOREIGN PATENT DOCUMENTS 0650156  4/1995  (EP) .

OTHER PUBLICATIONS

Abstract for Japanese application Serial No. 04190380, published on Feb. 10, 1994.*
Abstract for Japanese application Serial No. 02132884, publised on Jan. 30, 1992.*
Abstract for Japanese application Serial No. 6–28850, publised on Apr. 15, 1994.*
Patent Abstracts of Japan, JP 08 160521 A, Jun. 21, 1996, vol. 096, No. 010.
Patent Abstracts of Japan, JP 09 113986 A, May 2, 1997, vol. 097, No. 009.
Patent Abstracts of Japan, JP 09 081903 A, Mar. 28, 1997, vol. 097, No. 007.
Patent Abstracts of Japan, JP 10 104709 A, Jul. 31, 1998, vol. 098, No. 009.

* cited by examiner

Primary Examiner—Alan T. Faber
(74) Attorney, Agent, or Firm—Robin, Blecker & Daley

(57) ABSTRACT

A magnetic information reproducing apparatus includes a head which reads magnetic information from a magnetic recording medium, and an electric wire for supplying electric power from a power supply to a load, the electric wire being so disposed as to generate a magnetic field which cancels a magnetic field generated by the power supply.

7 Claims, 7 Drawing Sheets

2 (MAGNETIC HEAD)

MAGNETIC INFORMATION REPRODUCING APPARATUS HAVING POWER SUPPLY FIELD CANCELLATION FACILITY

BACKGROUND OF THE INVENTION

1. Field of the Invention

The present invention relates to a magnetic information reproducing apparatus which reads magnetic information from a magnetic recording part or the like provided on a photographic film.

2. Description of Related Art

It has been widely practiced to form a magnetic recording-and-reproducing area with a magnetic matter on a tape, like in the case of an audio tape, and to record or reproduce magnetic information on or from the tape by using an apparatus having a magnetic head.

Meanwhile, a photographic system which has recently become popular and commercialized is arranged to provide a film with a magnetic recording-and-reproducing area by forming a magnetic layer on the film, to provide a camera or a film scanner with a magnetic head, to write information about the date of photo-taking, a shutter speed, etc., into the magnetic recording-and-reproducing area with the magnetic head, and to read, as necessary, the information from the magnetic recording-and-reproducing area with the magnetic head.

Generally, a magnetic head and a magnetic reproducing circuit are highly prone to be affected by noises of varied kinds. When a strong magnetic field is inflicted from outside while a reproducing apparatus is in process of magnetic reproduction, for example, signals are apt to be erroneously reproduced. Therefore, some cameras have been developed not to be affected by such noises, as disclosed, for example, in Japanese Laid-Open Patent Application No. HEI 6-35059 and Japanese Laid-Open Utility Model Application No. HEI 6-28850.

Further, it has sometimes been difficult to read magnetic information with a magnetic head as the magnetic head is affected by an electromagnetic noise generated by a motor which is used as a drive source for transporting a magnetic recording medium. To solve this problem, some cameras have been developed against such a noise, as disclosed, for example, in Japanese Laid-Open Patent Application No. HEI 4-26832. According to the disclosure, the camera is provided with a magnetic head for recording or reproducing photo-taking information or the like on or from a film having a magnetic recording part, a driving motor is disposed within a take-up spool, and a shield case which is made of iron is disposed around the outer circumference of a motor yoke of the driving motor in a state of being insulated from the motor yoke. With the camera arranged in this manner, even if an electromagnetic noise generated by the rotation of the motor leaks from the motor yoke, the shield case prevents the magnetic head from being affected by the noise. The electromagnetic noise is prevented more effectively with copper plating applied to the shield case.

Other known examples of arrangement against the electromagnetic noises caused by motors were disclosed, for example, in Japanese Patent No. 2623468, Japanese Laid-Open Patent Application No. HEI 9-113986, etc. In these known examples, the adverse effect of such a noise is prevented by suitably arranging the layout of the motor and the magnetic head.

As mentioned above, the arrangements disclosed in Japanese Laid-Open Patent Application No. HEI 6-35059 and Japanese Laid-Open Utility Model Application No. HEI 6-28850 are developed against the adverse effect of a strong external magnetic field on the reproducing apparatus. The arrangements disclosed in Japanese Laid-Open Patent Application No. HEI 4-26832, Japanese Patent No. 2623468 and Japanese Laid-Open Patent Application No. HEI 9-113986 are developed against the adverse effect of an electromagnetic noise generated by a motor on the magnetic head.

In actuality, however, the magnetic head of a magnetic information reproducing apparatus receives also electromagnetic noise generated by a battery used as a power supply for a transport motor besides the above-stated strong external magnetic field and the noise generated by the motor. The magnetic head thus sometimes performs an erroneous reproducing action due to the noise generated by the battery. More specifically, when a current is allowed to flow from a battery to a motor having a brush to drive (rotate) the motor, the current varies according to the phase of the shaft of the motor. Then, a change in magnetic field is brought about by the battery itself to affect the magnetic head.

BRIEF SUMMARY OF THE INVENTION

In accordance with one aspect of the invention, there is provided a magnetic information reproducing apparatus, such as a camera, which comprises a head which reads magnetic information from a magnetic recording medium, and an electric wire for supplying electric power from a power supply to a load, the electric wire being so disposed as to generate a magnetic field which cancels a magnetic field generated by the power supply, so that the magnetic head can be prevented from being affected by an electromagnetic noise generated by the power supply.

The above and other aspects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
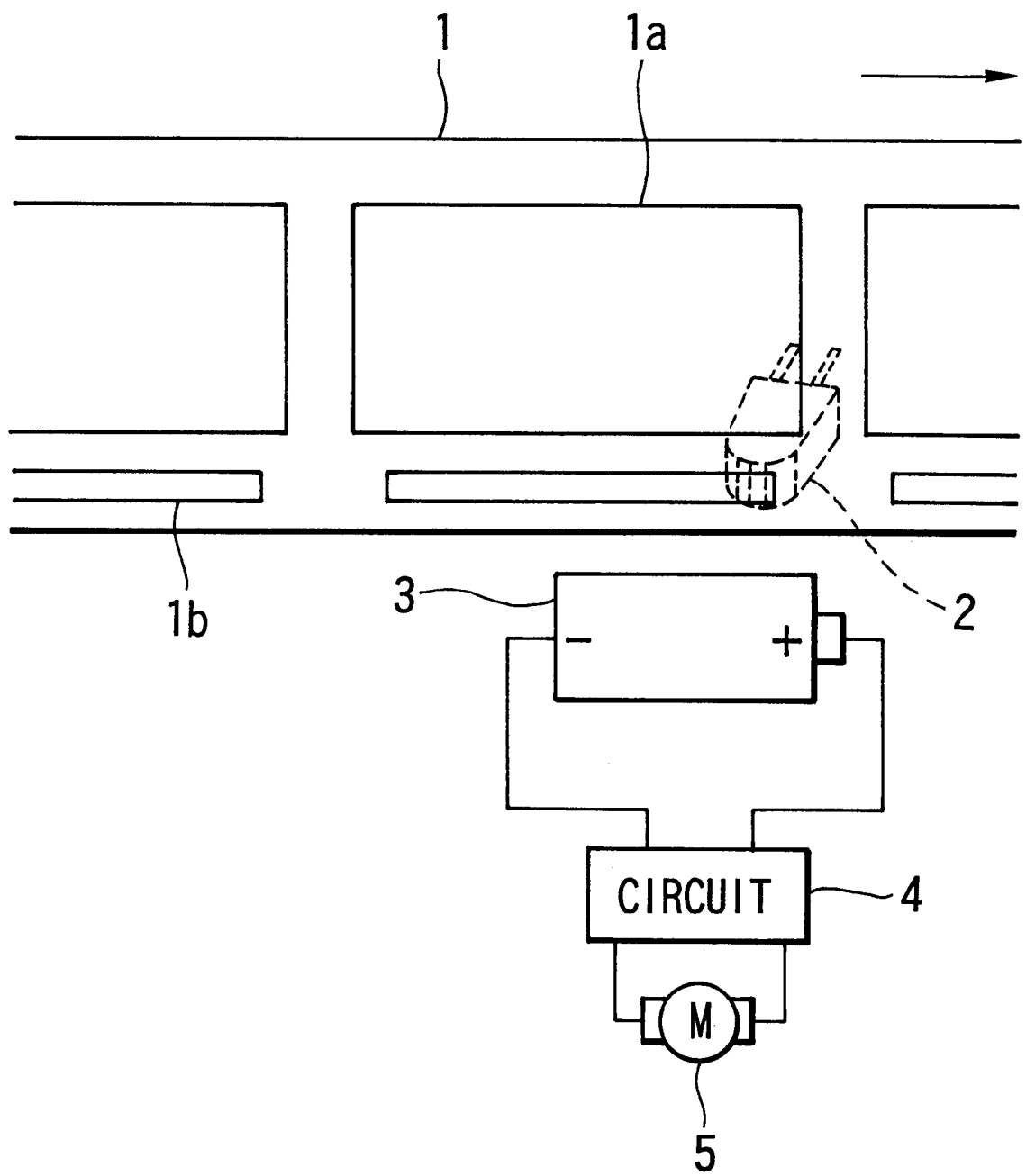
FIG. 1 shows the wiring arrangement for essential parts of a camera.

FIG. 1 shows a part of a camera capable of recording and reproducing magnetic information on and from a photographic film.

Referring to FIG. 1, a film 1 is a medium to be used for recording images taken by the camera. The film 1 has frame parts 1a for recording images, and magnetic recording parts 1b for recording magnetic information. A magnetic head 2 records magnetic information in each of the magnetic recording parts 1b or reproduces the recorded magnetic information from the magnetic recording part 1b. A battery 3 is arranged as a power supply and is disposed in the neighborhood of the magnetic head 2. A circuit 4 is arranged to supply electric power received from the battery 3 to a motor 5 and other parts. The motor 5 is arranged as a power source (drive source) for transporting the film 1.

In reproducing magnetic information recorded in the magnetic information recording part 1b of the film 1, electric power is supplied from the battery 3 to the circuit 4 and the motor 5 to transport the film in the direction of an arrow, i.e., to the right as viewed in FIG. 1. While the film 1 is in process of being transported, the magnetic head 2 detects variations in magnetic field of the magnetic information recording part 1b to reproduce the magnetic information.

FIGS. 2(a) to 2(d) show the details of the magnetic head 2 shown in FIG. 1.

Figure 2A:
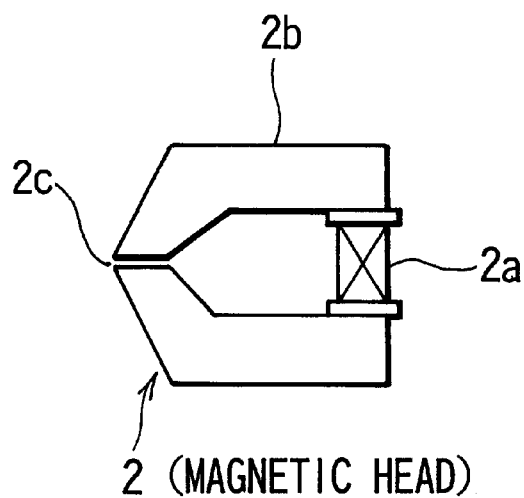
FIGS. 2(a) to 2(d) show the structural arrangement of a magnetic head shown in FIG. 1 and a magnetic field generating state of the magnetic head.

Referring to FIG. 2(a), the magnetic head 2 is composed of a coil 2a and a core 2b. The coil 2a is wound on the core 2b. The core 2b is provided with a gap 2c. The magnetic head 2 is arranged to be in contact with the magnetic recording part 1b of the film 1 at its part where the gap 2c is formed.

Figure 2B:
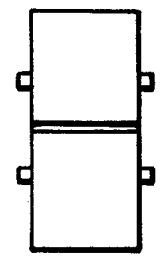
Figure 2C:
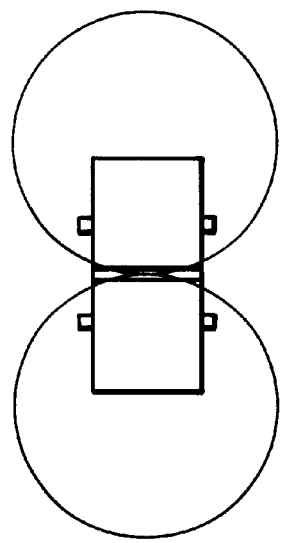
Figure 2D:
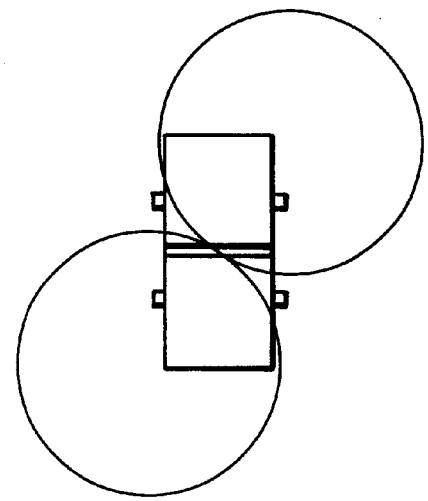

FIGS. 2(b), 2(c) and 2(d) respectively show the magnetic head 2 as viewed from the gap 2c. FIGS. 2(c) and 2(d) show the directivity of the magnetic head 2 with respect to a magnetic field. FIG. 2(c) shows the magnetic head 2 as having an ideal directivity and not affected by any magnetic field located on a horizontal side thereof as viewed in FIG. 2(c). FIG. 2(d), on the other hand, shows the magnetic head 2 as having such directivity that somewhat deviates from the ideal directivity. In the case of FIG. 2(d), the magnetic head 2 is inevitably somewhat affected by magnetic fields located on its right and left sides. Such directivity is considered to be caused by a deviation of symmetry of the core part, a positional deviation of a head case (not shown), etc. Generally, the directivity of magnetic heads manufactured by mass production slightly deviates from the ideal directivity.

Figure 3:
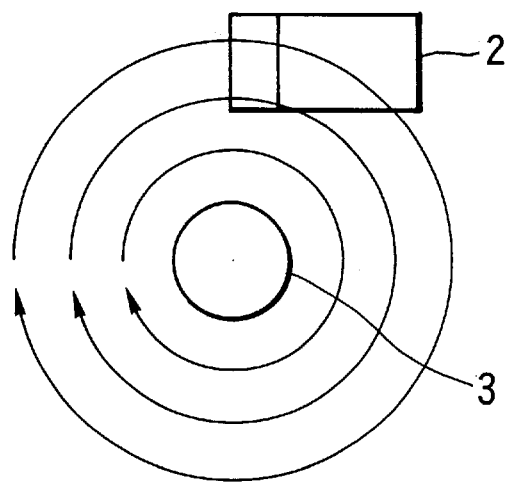
FIG. 3 shows the allocation of the magnetic head and a battery and a magnetic field.

FIG. 3 shows the positional relation between the magnetic head 2 and the battery 3 and a magnetic field generated by the battery 3. The battery 3 is assumed to have a current flowing therein from its front side toward its rear side as viewed in FIG. 3. As mentioned also in the foregoing description of the prior art example, when electric power is supplied from the battery 3 to the motor 5 to cause the motor 5 to rotate, a change of current is brought about by the rotation phase of a motor shaft (not shown) of the motor 5, and, at the same time, the intensity of the magnetic field generated by the battery 3 is then caused to vary by the change of current.

A magnetic head having the ideal directivity as shown in FIG. 2(c) is not affected by the magnetic field which is as shown in FIG. 3. However, if the magnetic head 2 has even a slight deviation from the ideal directivity, as shown in FIG. 2(d), the magnetic head 2 is affected by the magnetic field generated by the battery 3.

Figure 4:
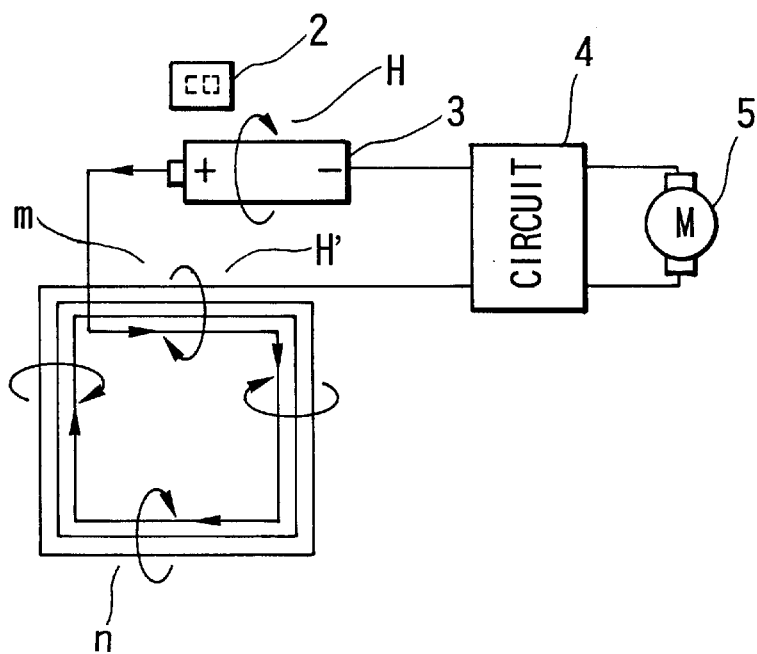
FIG. 4 is a wiring diagram showing the wiring arrangement of the first embodiment of the invention.

FIG. 4 shows the details of the wiring made for the battery 3, the circuit 4 and the motor 5 shown in FIG. 1 together with the allocation of the magnetic head 2.

As shown in FIG. 4, an electric wire extending from the positive terminal of the battery 3 is so disposed as to have a plurality of turns in the neighborhood of the battery 3, and in such a way that the direction of a current flowing at a part "m" of the electric wire located near to the battery 3 is approximately opposite to the direction of a current flowing within the battery 3. In other words, a magnetic field H' is generated by the current flowing the part "m" of the electric wire disposed in a winding shape. This magnetic field H' acts to cancel a magnetic field H generated by the current flowing within the battery 3.

Therefore, when viewed from the magnetic head 2, while the magnetic head 2 is under the influence of the magnetic field H generated by the battery 3, the magnetic field H' generated by the part "m" of the electric wire disposed in a winding shape also influences the magnetic head 2.

Further, while a distance between the magnetic head 2 and the battery 3 is shorter than a distance between the magnetic head 2 and the part "m" of the electric wire, as shown in FIG. 4, the intensity of the magnetic field generated by the part "m" of the electric wire is stronger than that of the magnetic field generated by the battery 3, because the part "m" of the electric wire has a plurality of turns of wire. In addition to that, the direction of the magnetic field generated by the part "m" of the electric wire is opposite to that of the magnetic field generated by the battery 3. In other words, when viewed from the magnetic head 2, the influence of the magnetic field H generated by the battery 3 and that of the magnetic field H' generated by the part "m" of the electric wire are canceled by each other. Therefore, the magnetic head 2 is almost completely unaffected by both of the magnetic fields H and H'.

Generally, a magnetic field generated by a current flowing through one electric wire can be canceled by disposing another wire adjacent to the one electric wire in such a way as to allow a current to flow there in the same amount but in a direction opposite to the direction of the current. The canceling arrangement is possible where two electric wires can be set in positions which are approximately equivalent to each other.

However, since the battery 3 has a certain volume, it is very difficult to set wiring in position equivalent to the battery 3. In view of this, the first embodiment of the invention is arranged to have a plurality of wires disposed in the neighborhood of the battery 3 to allow a current to flow there in the direction opposite to the direction of the current flowing within the battery 3. This arrangement represents a feature of the invention as it effectively prevents the magnetic head from being affected by a magnetic field.

Further, a magnetic field generated by a part "n", which is a part of the electric wire disposed in a winding shape, is in the same direction as the direction of the magnetic field generated by the battery 3. However, since the part "n" is located away from the magnetic head 2, the magnetic head 2 is little affected by the magnetic field generated by the part "n".

It is apparent from the foregoing that the layout of the whole magnetic information reproducing arrangement should be made in such a manner that a total magnetic field including the magnetic field generated by the battery 3 and the magnetic field generated by the electric wire disposed in a winding shape is canceled when viewed from the magnetic head 2.

Figure 5:
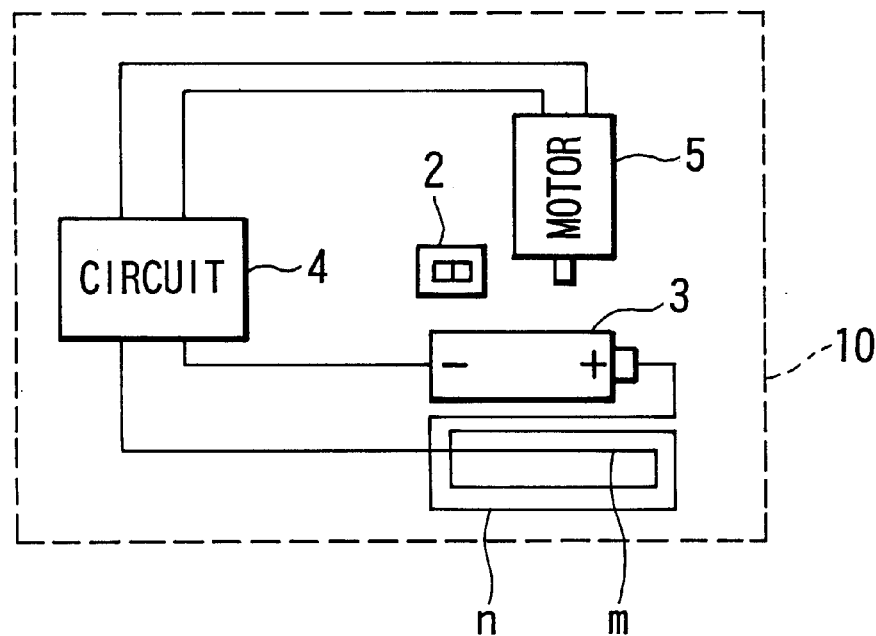
FIG. 5 is a circuit diagram showing the wiring made for a camera according to the first embodiment of the invention.

FIG. 5 shows the whole layout of the camera described above with reference to FIG. 1. In FIG. 5, reference numeral 10 denotes the outer casing of the camera. The outer casing 10 contains therein the magnetic head 2, the battery 3, the circuit 4 and the motor 5, which are provided with the wiring as described above with reference to FIG. 4. The part "n" of the electric wire disposed in a winding shape is located at a lower part in FIG. 5. However, since such allocation of the part "n" would cause an increase in size of the lower part of the camera, the part "n" may be set in the front or rear part of the camera (in front or in rear of the paper surface of the drawing of FIG. 5) within a range permissible by the layout of the camera.

FIGS. 6 to 10 show other examples of wiring for the battery 3, the circuit 4 and the motor 5.

Figure 6:
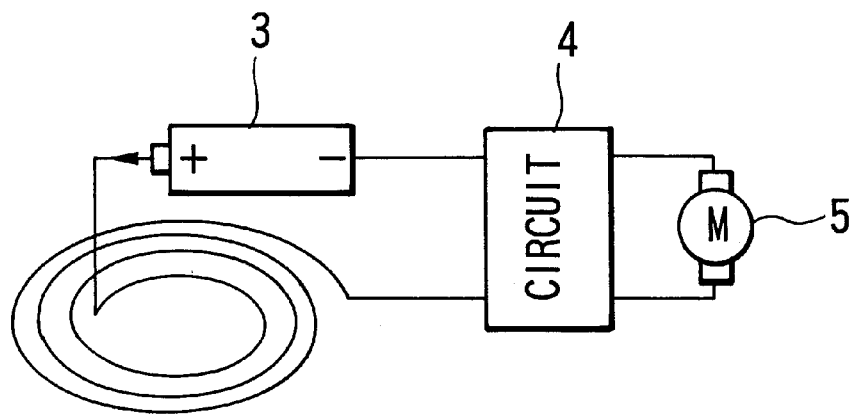
FIG. 6 is a wiring diagram showing a first example of modification of the wiring shown in FIG. 4.
Figure 7:
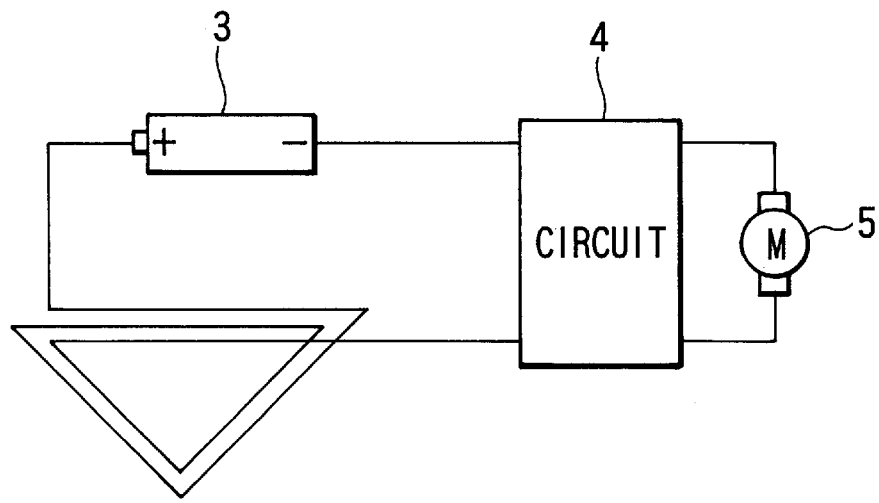
FIG. 7 is a wiring diagram showing a second example of modification of the wiring shown in FIG. 4.
Figure 8:
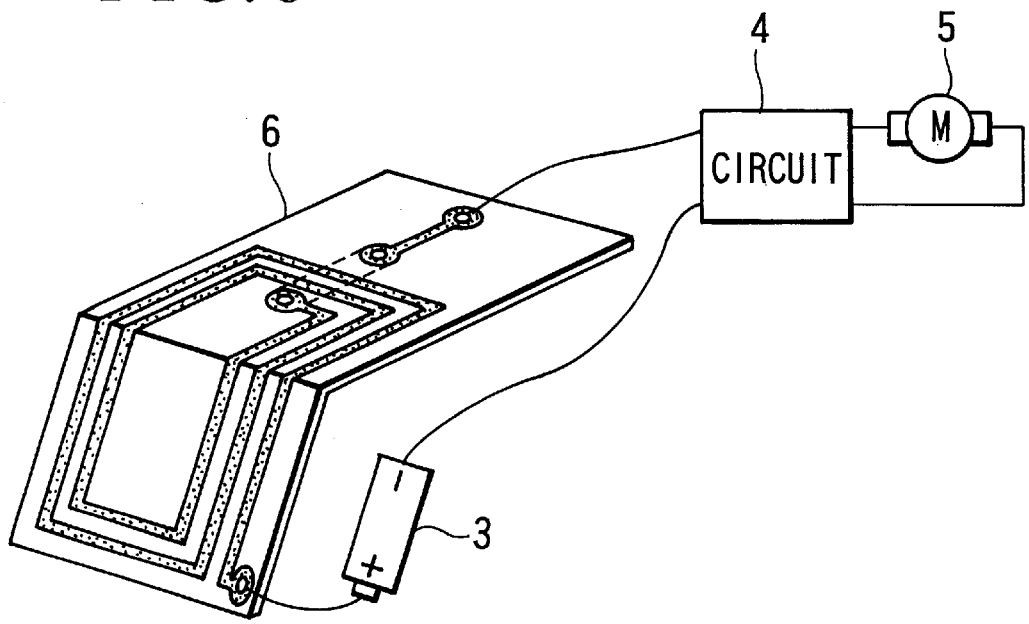
FIG. 8 is a wiring diagram showing a third example of modification of the wiring shown in FIG. 4.

In the wiring example shown in FIG. 6, the wound wiring part is coiled in an elliptic shape. In the wiring example shown in FIG. 7, the wound wiring part is coiled in a triangular shape. In the wiring example shown in FIG. 8, the wound wiring part is replaced with a printed circuit board 6, which can be bent as desired according to the shape and condition of the magnetic information reproducing apparatus.

Figure 9:
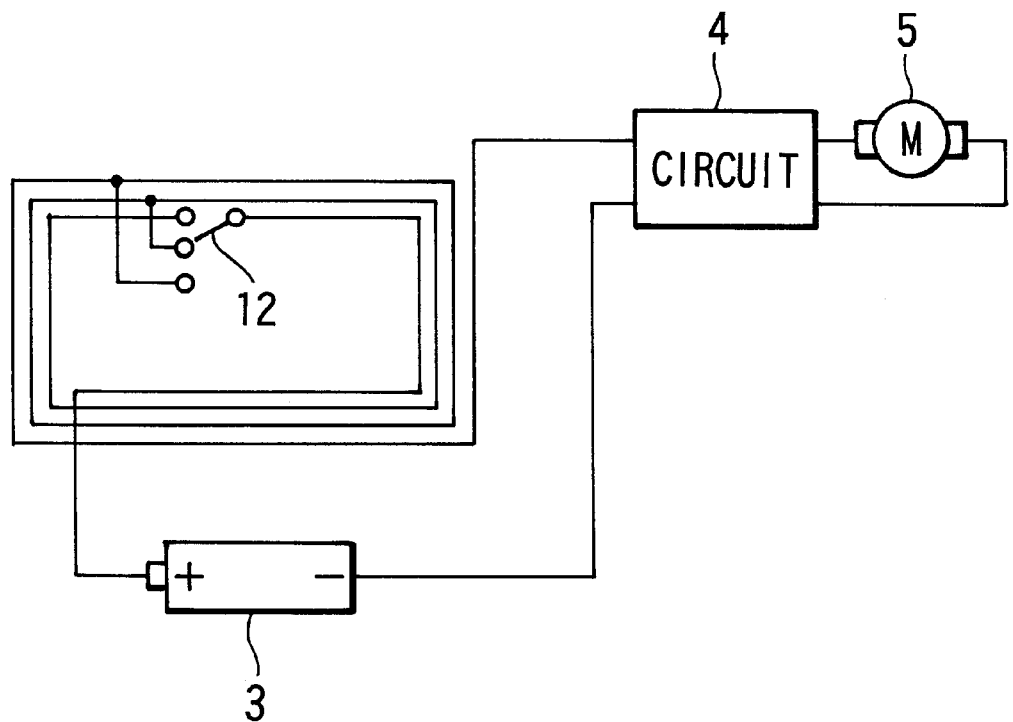
FIG. 9 is a wiring diagram showing a fourth example of modification of the wiring shown in FIG. 4.

In the wiring example shown in FIG. 9, a switch 12 is located at a part of an electric wire disposed in a winding shape to permit the number of turns of the winding to be switched from one number over to another by changing the connecting position of the switch 12 from one connecting position over to another. The switch 12 is provided for adjusting the intensity of the magnetic field as desired by varying the number of turns of the wound wiring part of the electric wire.

Figure 10:
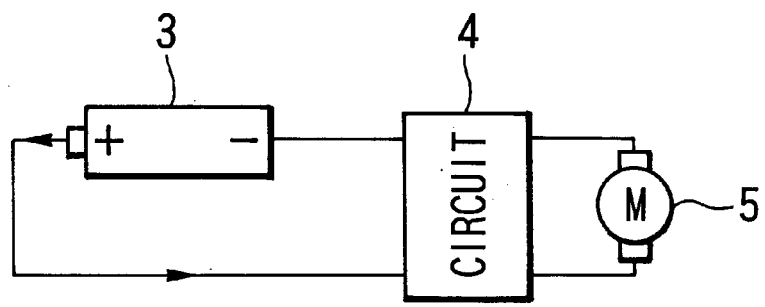
FIG. 10 is a wiring diagram showing a fifth example of modification of the wiring shown in FIG. 4.

In the wiring example shown in FIG. 10, the electric wire includes no wound wiring part and is simply arranged to let a current flow there in the direction opposite to the direction of a current flowing within the battery 3, so that the magnetic field generated by the battery 3 can be canceled by the magnetic field generated by the electric wire in the opposite direction. Even in this case, the simple wiring arrangement gives a certain advantageous effect although the effect is less than the effect attainable by the wiring examples in which the electric wire includes a wound wiring part.

Figure 11:
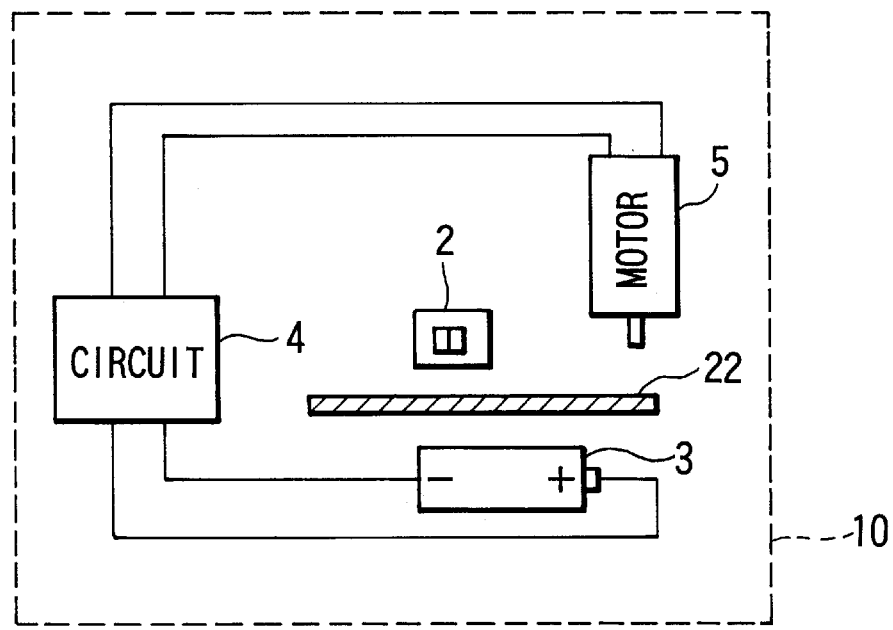
FIG. 11 is a circuit diagram showing the wiring made for essential parts of a camera according to a second embodiment of the invention.
Figure 12:
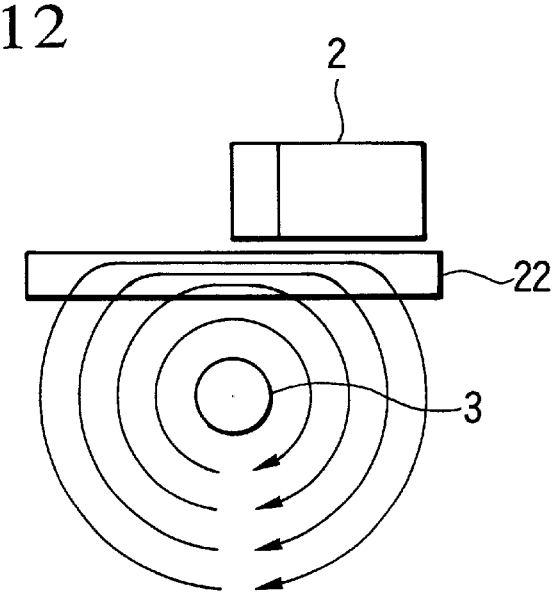
FIG. 12 shows the relation of a magnetic head, a battery and a magnetic shield plate in the second embodiment of the invention.

FIGS. 11 and 12 relate to a second embodiment of the invention. FIG. 11 shows the whole layout of a camera as a magnetic information reproducing apparatus. The second embodiment differs from the first embodiment shown in FIG. 5, in that the electric wire includes no wound wiring part but a magnetic shield plate 22 which is of a high permeability material, such as permalloy, is located between a magnetic head 2 and a battery 3.

FIG. 12 shows a positional relation among the magnetic head 2, the battery 3 and the magnetic shield plate 22 together with a magnetic field generated by the battery 3. As apparent from FIG. 12, the magnetic shield plate 22 prevents a magnetic field generated by the battery 3 from reaching the magnetic head 2, thereby enabling the magnetic head 2 to act without being affected by the magnetic field generated by the battery 3.

A main feature of the second embodiment lies in that the magnetic head 2 is prevented by the magnetic shield plate 22 from being affected by the magnetic field generated by the battery 3. The arrangement of the magnetic shield plate 22 in the second embodiment may be replaced with some other suitable magnetic shield means. For example, a battery chamber which is not shown may be made of a high permeability material such as permalloy, or a high permeability sheet material may be arranged to cover the whole body of the battery 3.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while the invention is applied to a camera of the kind arranged to be capable of recording and reproducing magnetic information in the case of each of the embodiments disclosed, the invention is not limited to the cameras of that kind. The arrangement according to the invention is applicable also to other magnetic information reproducing apparatuses having a magnetic head and a battery, such as a film scanner device and an apparatus arranged to reproduce records from a floppy disk, an audio tape or a video tape.

While a transport motor is arranged to be a load in each of the embodiments disclosed, the load is not limited to such a motor but may be, for example, a flash device or the like.

In the case of each of the embodiments disclosed, the invention is applied, by way of example, to a camera having a magnetic head arranged to perform a magnetic reproducing action. However, the same advantageous effect is attainable by applying the invention to an apparatus having a magnetic head arranged to perform a magnetic recording action.

The invention may be carried out by combining as necessary the embodiments or their technological elements described in the foregoing.

The invention applies to cases where either the whole or a part of claims or the arrangement of each embodiment disclosed forms one apparatus or is used in combination with some other apparatus or as a component element of an apparatus.

According to the arrangement of each embodiment disclosed, a magnetic information reproducing apparatus can be arranged to be capable of minimizing the adverse effect of an electromagnetic noise generated by a battery on a magnetic head.

Further, the arrangement for intensifying the magnetic field generated by the whole electric wiring by arranging the electric wire to include a wound wiring part composed of a plurality of turns makes the magnetic information reproducing apparatus to be capable of minimizing the adverse effect of an electromagnetic noise generated by a power supply.

Further, even if the intensity of electromagnetic noise generated by a power supply varies according to the state and condition of each individual apparatus, the disclosed arrangement for adjusting the intensity of the magnetic field generated by the whole wiring by varying the number of turns of the wound wiring part of the electric wire effectively enables the magnetic information reproducing apparatus to reliably minimize the adverse effect of the electromagnetic noise of the power supply on the magnetic head of the apparatus.

Further, the arrangement of each of the magnetic information reproducing apparatuses disclosed permits an electric wiring to have a wound wiring part formed in a stable shape and to be made by efficiently utilizing spaces available within the apparatus.

What is claimed is:

1. A magnetic information reproducing apparatus comprising a casing containing:

(A) a head which reads magnetic information from a magnetic recording medium; and (B) an electric wire for supplying electric power from a power supply to a load, said electric wire being so disposed as to generate a magnetic field which cancels a magnetic field generated in said casing by said power supply.

2. A magnetic information reproducing apparatus according to claim 1, wherein said electric wire is so disposed as to generate a magnetic field in a direction opposite to a direction of the magnetic field generated by said power supply.

3. A magnetic information reproducing apparatus according to claim 1, wherein said electric wire is disposed in a winding shape.

4. A magnetic information reproducing apparatus according to claim 1, wherein said electric wire is disposed in a winding shape having a plurality of turns.

5. A magnetic information reproducing apparatus according to claim 4, further comprising a number-of-turns varying device for varying number of turns of said electric wire disposed in a winding shape having a plurality of turns.

6. A magnetic information reproducing apparatus according to claim 1, wherein said magnetic information reproducing apparatus includes a camera.

7. A magnetic information reproducing apparatus according to claim 1, wherein said magnetic information reproducing apparatus includes a film scanner.

* * * * *